United States Patent [19]

Stein

[11] Patent Number: 4,548,715
[45] Date of Patent: Oct. 22, 1985

[54] PROCESS FOR AERATION OF EFFLUENTS IN EQUALIZING AND RESERVOIR BASINS

[75] Inventor: Theodor Stein, Kamen, Fed. Rep. of Germany

[73] Assignee: Schering AG, West Berlin, Fed. Rep. of Germany

[21] Appl. No.: 298,975

[22] Filed: Sep. 3, 1981

Related U.S. Application Data

[63] Continuation-in-part of Ser. No. 242,962, Mar. 12, 1981, abandoned.

[51] Int. Cl.$^4$ ................................................ C02F 3/02
[52] U.S. Cl. ..................................... 210/614; 210/620
[58] Field of Search ............................... 210/620–629, 210/614, 903, 96.1

[56] References Cited

U.S. PATENT DOCUMENTS 4,268,397  5/1981  Horie et al. ...................... 210/903
4,277,342  7/1981  Hayes et al. ...................... 210/614
4,308,150  12/1981  Miyaoka et al. ................... 210/614

FOREIGN PATENT DOCUMENTS 50-147154  11/1975  Japan ................................. 210/903
51-20072   2/1976   Japan ................................. 210/614
701958     12/1979  U.S.S.R. ........................... 210/903

Primary Examiner—Benoit Castel

[57] ABSTRACT

The invention concerns a process for the aeration of industrial and commercial effluents in equalizing and reservoir basins before the effluent is cleaned in a conventional biological treatment plant. The aeration is conducted at a low redox potential, favorably attained by controlling the rate of aeration in dependence on the redox potential, as the set point and thereby keeping the redox potential at a constant value. Furthermore the addition of minimum substances, if necessary, can be conducted in dependence on the redox potential and the intensity of the aeration.

12 Claims, No Drawings

PROCESS FOR AERATION OF EFFLUENTS IN EQUALIZING AND RESERVOIR BASINS

CROSS REFERENCE TO RELATED CASES

This is a continuation-in-part of copending application Ser. No. 242,962, filed Mar. 12, 1981, entitled "Procedure for Aeration of Effluents in Equalizing and Reservoir Basins", and now abandoned.

TECHNICAL FIELD

The invention concerns a process for the aeration of industrial effluents in an equalizing and reservoir basin.

By known aeration processes with low oxygen supply, which are carried out in the reservoir and equalizing basins in order to prevent decay only a degradation of 10%, up to 20% at most, is reached automatically, whereas sludge is generated by excessive oxygen charging. This should be avoided because of the high cost of sludge disposal.

BACKGROUND OF INVENTION

It is an object of this invention to disclose an aeration process that achieves higher degradation values without production of activated sludge. This is achieved by conducting the aeration in a way that flocculation is avoided and the bacteria remain as individuals.

SUMMARY OF INVENTION

The process according to this invention is characterized in that the aeration is carried out at a negative range of redox potential, preferably at −200 mV to −500 mV.

DESCRIPTION OF PREFERRED EMBODIMENTS

It was determined that after sufficient adaption time at strongly reduced aeration a biozoenose is formed which can consume up to 50% of the organic effluent waste load present when the formation of bacterium flakes usually occuring in the biological effluent purification is avoided, as the bacteria remain as individuals. A growth of pathogenic strains did not occur.

Furthermore, it was surprisingly found that under the conditions of the process the oxygen transfer values increase significantly. With a commercial aeration equipment, whose oxygen transfer performance, determined in pure water, was 20 kg $O_2$/hrs, performances of approximately 40 kg $O_2$/hrs were reached at equal current usage, at a water depth of 3 meters and a current consumption of 18 kW.

If one aerates a basin according to the procedure of this invention, the organic waste loads which are delivered to a subsequent biological treatment are significantly reduced. Therefore, the addition of oxygen which is much more costly in biological treatment is reduced and the production of excess sludge, whose disposal is 65-75% of the cost of a conventional activated sludge plant, is diminished.

In the procedure of the invention, the biomass adjusts the pH to the value of approximately 7 even if the pH values of the inflowing effluent vary between 4 and 11 during the day, averaging between 5 and 8.

The process according to the invention is therefore applicable also for the aeration of waste water with strongly varying pH-values.

After the already mentioned adaptation time with diminished aeration, the redox potential during continuous operation is kept at a constant value in the range between −200 to −500 mV, preferably in the range −200 mV to −300 mV. The nearer to the value of −200 mV the procedure is conducted, the more important it is to keep the redox potential at a constant value to avoid flocculation. (The redox potentials mentioned here are given in values from a measuring apparatus Fa. Ingold, Pt-4825-60.)

The concentration of the bacteriae is very low, about 200 to 300 mg/l. The formation of new biomass is low too, about 0,23 kg per kg COD degraded.

According to this invention the aeration is controlled in dependence from the deviation of the actual redox potential from the predetermined value.

It is advisable to use a computer, which, according to the predetermined set point of the redox potential, controls the on/off switch of the aerators. The computer is continuously fed with the actual value of the redox potential. Moreover, the aeration equipments are reversed in a certain sequence, when they are not in full speed, so that all parts of the basin are totally mixed.

As usual, the addition of minimum substances, if necessary, normally phosphate in industrial effluents, is done in such amounts that the losses of biomass which are caused by dilution are compensated. The addition can be controlled, too in dependence on the redox potential and/or the operating time of the aerators. In this case, too, it is advisable to use a computer.

The control is achieved in such a way that, if the redox potential drops under the predetermined set point even though the aeration equiment is fully used, the concentration of bacteria is lowered by diminuation of the minimum substance. The addition of minimum substance is increased when the efficiency of the aeration equipment drops too much when the redox potential is kept at the predetermined value.

Redox potential, intensity of aeration, minimum substance addition, and concentration of biomass influence each other and must be considered during the adjustment. In the procedure according to the invention, the redox potential is the primary reference value.

I claim:

1. In a method for the biodegradation of a biodegradable industrial organic waste steam held under aeration in a basin, the improvement of operating essentially in the absence of flock by controlling the rate of oxidation of said organic waste by control of the oxygen level below that which will cause flocculation, said level resulting in minimum sludge formation.

2. Process of claim 1 wherein the redox potential of the system is maintained within the range of −200 to −500 mV.

3. The process of claim 1 or 2 wherein the pH, during the biodegradation, is about 7.

4. The process of claim 1 or 2 wherein the COD of the waste stream is above 1200 mg/liter.

5. The process of claim 1 or 2 wherein the incoming waste water has a pH of 4-11.

6. The process of claim 1 or 2 wherein the incoming waste water has a pH of 5-8.

7. The process of claim 1 or 2 being carried out in an equalizing and reservoir basin.

8. The process of claim 7 wherein said value is about minus 200 mV.

9. The process of claim 8 wherein a maximum of about 0.23 kg of new biomass per kg COD degradated is formed.

10. The process of claim 2 wherein said redox potential, during continuous operation, is kept at a constant value in the range minus 200 mV to minus 300 mV.

11. The process of claim 1 or 2 wherein about 200 to about 300 mg/l of bacteriae are present in said waste water.

12. The process of claim 2 wherein the potential is maintained substantially constant throughout the degradation.

* * * * *